United States Patent
Giannakakos et al.

(10) Patent No.: US 6,726,421 B2
(45) Date of Patent: Apr. 27, 2004

(54) TANGED SCREW THREAD INSERTS WITH IMPROVED REMOVABILITY

(75) Inventors: William Giannakakos, Danbury, CT (US); John F. Carvalho, Danbury, CT (US)

(73) Assignee: Newfrey LLC, Newark, DE (US)

( * ) Notice: Subject to any disclaimer, the term of this patent is extended or adjusted under 35 U.S.C. 154(b) by 13 days.

(21) Appl. No.: 09/949,696

(22) Filed: Sep. 10, 2001

(65) Prior Publication Data

US 2003/0049096 A1 Mar. 13, 2003

(51) Int. Cl.7 ................................................. F16B 37/12
(52) U.S. Cl. ......................................... 411/438; 411/178
(58) Field of Search .............................. 411/16, 17, 18, 411/178, 438

(56) References Cited

U.S. PATENT DOCUMENTS

| | | | |
|---|---|---|---|
| 2,371,674 A | | 3/1945 | Caminez |
| 2,390,514 A | * | 12/1945 | Cram ........................... 411/438 |
| 2,607,259 A | * | 8/1952 | Forster ........................ 411/438 |
| 4,563,119 A | | 1/1986 | Cosenza |
| 5,860,779 A | | 1/1999 | Toosky et al. |
| 6,171,040 B1 | | 1/2001 | Sato |

FOREIGN PATENT DOCUMENTS

| EP | 1 068 812 A2 | 12/2000 |
|---|---|---|

* cited by examiner

*Primary Examiner*—Neill Wilson
(74) *Attorney, Agent, or Firm*—Harness, Dickey & Pierce, P.L.C.

(57) ABSTRACT

A helical thread insert having a removable tang attached to the front end of the insert, a retention device, and a removal notch located along the rear portion of the insert. The removable tang is oriented radially inward and includes a "V" shaped notch oriented along a bottom of a thread to detach the tang at a specified point. The retention device is located at a rear end of the thread insert and prevents counterclockwise, or removal rotation of the insert by engaging female threads of the bore in which the helical thread insert is disposed. The removal notch is formed along an inner surface of the insert proximal to the retention device to allow a tool to actuate the retention device inward, generally away from the female threads of a parent material, to allow relatively free counterclockwise rotation and removal of the thread insert.

7 Claims, 3 Drawing Sheets

TANGED SCREW THREAD INSERTS WITH IMPROVED REMOVABILITY

FIELD OF THE INVENTION

The present invention relates to a thread insert. More specifically, the present invention relates to a helical thread insert having a removable tang for installation, a removal notch formed in the last thread of the insert and a retention device.

BACKGROUND OF THE INVENTION

Helical thread inserts are used in many industries to provide female threads in a threaded bore located in a parent material having a relatively low hardness. The helical thread inserts are installed using a special tool that grasps a removable tang located at the leading end of the helical thread insert and guides the insert into the threaded bore in the parent material. The tang is then removed to provide a threaded bore having full thread engagement and female threads with a greater hardness than the female threads formed in the original threaded bore. In the event that the helical thread inserts become worn or damaged, removal of the thread insert may be required.

In recognition of the need to remove helical thread inserts several devices have been developed. Some helical thread inserts include a pair of diametrically opposed notches formed in the last thread of the insert. The notches allow a flathead screwdriver or other tool to apply a counterclockwise torque to guide the insert out of the original threaded bore. However, the use of a flathead screwdriver or other tool may apply forces that drive the insert back into the threaded bore or expand the last thread of the insert radially outward. If the tool applies a force on the insert that pushes the insert back into the original threaded bore, removal of the thread insert is made more difficult because the desired direction of movement of the insert, out of the hole, is opposite of the force that is applied on the insert. Additionally, if the tool causes expansion of the last thread of the insert, the end of the thread may dig into the parent material causing removal of the thread insert to be more difficult and possibly damaging the parent material. In recognition, thread inserts have been developed that have chamfered and radiused edges formed around the end of the last thread to prevent the thread from digging into the parent material.

However, one concern associated with helical thread inserts is retention capability, the ability of the insert to remain in the threaded bore. The use of chamfered or radiused ends reduces the ability of the end of the thread insert to grasp the parent material to prevent counterclockwise movement, leading to inadvertent removal of the insert. Additionally, the increasing popularity of stainless steel helical thread inserts in combination with stainless steel threaded fasteners may lead to galling. If galling occurs, the forces applied to the threaded fastener are directly transferred to the helical thread insert, thus increasing the likelihood that the helical thread insert will not remain in the threaded bore.

SUMMARY OF THE INVENTION

Accordingly, the present invention provides a helical thread insert having a tang for installation, a square end providing increased retention, and a removal notch. The tang is attached to a front end of the helical thread insert to provide a means of installing the insert. The square end prevents counterclockwise rotation of the insert, whereby counterclockwise rotation may lead to inadvertent removal of the insert. The removal notch provides a means of selectively removing the insert without engaging the retention device.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiments is merely exemplary in nature and is in no way intended to limit the invention, its application, or uses.

Figure 1:
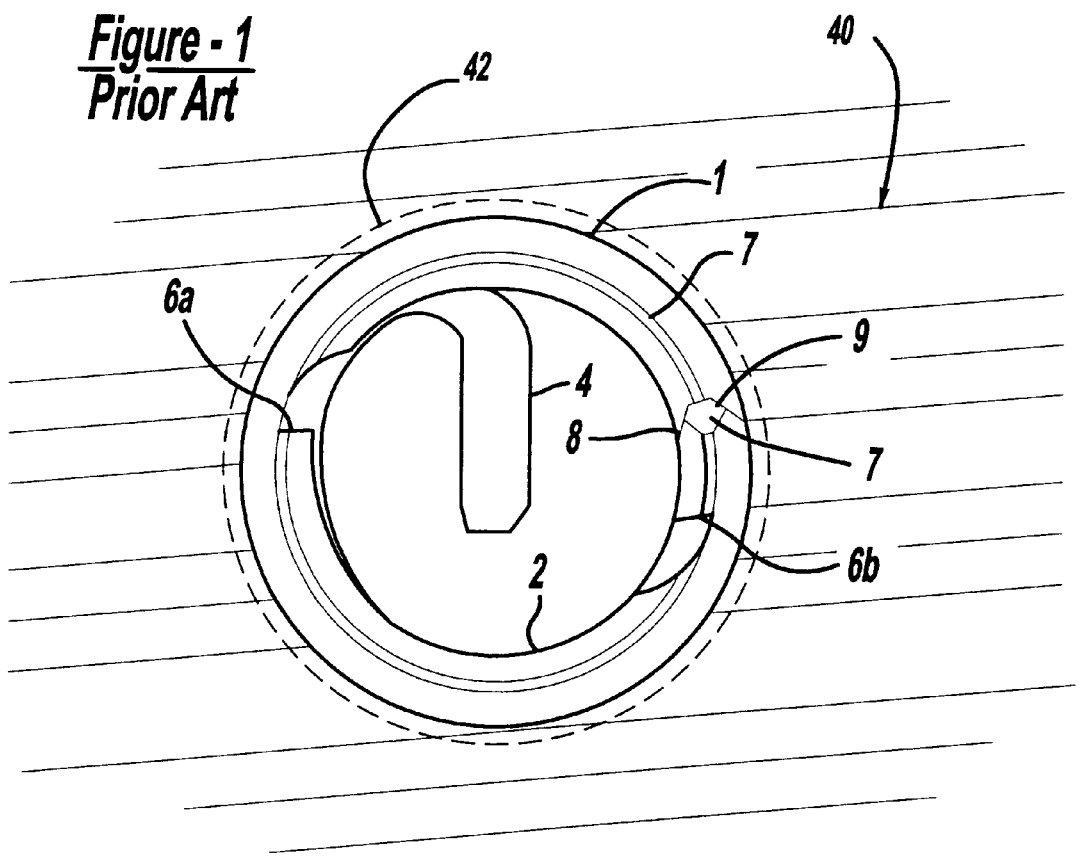
FIG. 1 is a rear view of a prior art thread insert.

FIG. 1 illustrates a prior art helical thread insert 1 such as that described in U.S. Pat. No. 6,171,040 to Sato. Helical thread insert 1 is formed of a coiled wire body 2, having a tang 4 located at a leading end for installation and a pair of removal notches 6A and 6B located at a trailing end 7. The removal notches 6A and 6B are positioned in a diametrically opposed orientation to allow a tool such as a flathead screwdriver (not shown) to remove the insert 1. The trailing end 7 of the coil 1, includes chamfers 8 and 9 to prevent trailing end 7 from digging into the female threads of the bore (not shown) in which it is installed.

Figure 2:
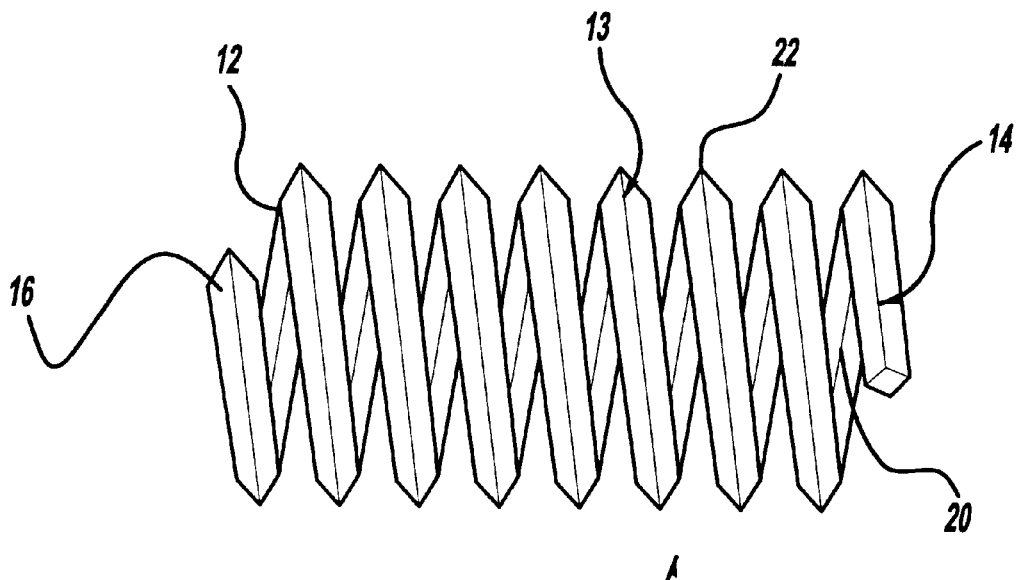
FIG. 2 is a side view of a thread insert according to the preferred embodiment.
Figure 3:
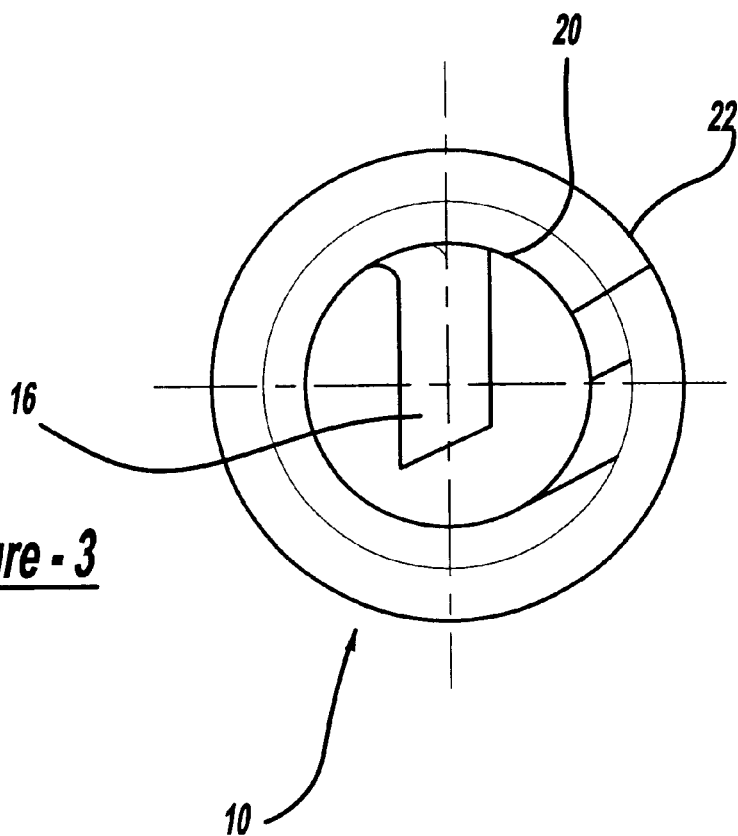
FIG. 3 is a rear view of a thread insert according to the preferred embodiment.
Figure 4:
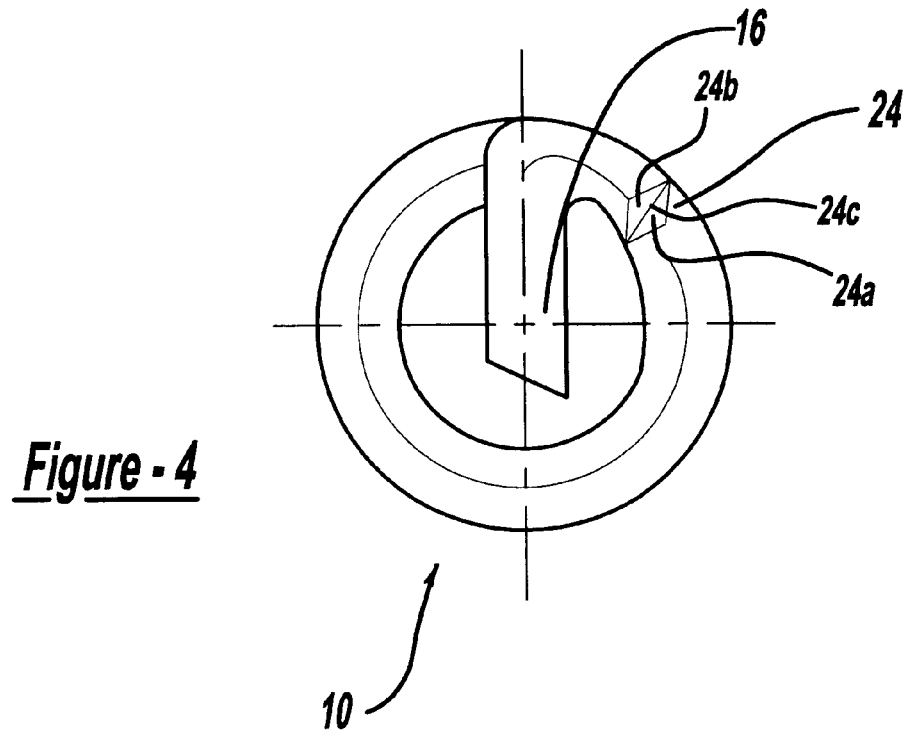
FIG. 4 is a front view of a thread insert according to the preferred embodiment.

FIGS. 2–4 illustrate a helical thread insert 10 constructed in accordance with the preferred embodiment of the present invention. The helical thread insert 10 is generally comprised of a front end portion 12 and a rear end portion 14 interconnected by a central portion 13. The helical shape of the insert 10 is preferably formed to provide a male thread 22 along an outer surface of helical thread insert 10 that is complementary to female threads 44 formed in the parent material 40. A female thread 20 having a substantially higher hardness than the relatively low hardness of the parent material 40 is further provided and is disposed along an inner surface of the helical thread insert 10.

In a preferred embodiment of the present invention, a tang 16 is attached to the front end portion 12 of the helical thread insert 10 to assist in installing the helical thread insert 10 in a threaded bore 42. Tang 16 extends radially inward from a distal end of the front end portion 12 to provide a means of grasping the helical thread insert 10 while applying a rotational force to guide the helical thread insert 10 into the threaded bore 42. It is also desirable that helical thread insert 10 include a device to detach tang 16 from the front end portion 12 to allow a threaded fastener (not shown) to extend further than the depth of the helical thread insert 10 (e.g. a through hole). In the preferred embodiment of the present invention, a notch 24 is formed along a bottom surface of a first thread at the front end portion 12. Notch 24 is formed in a "V" shape to have a first plane 24A and a second plane 24B intersecting to form a line 24C that is the terminus of the notch.

To remove tang 16 from the front end portion 12 of the helical thread insert 10 a simple implement may be used to apply a force on tang 16. Once a requisite force has been applied, tang 16 will fracture proximal to notch 24 as a result of the increased stress concentration at notch 24.

FIG. 1 shows a prior art helical thread insert 1 disposed in a threaded bore 42 of a parent material 40. Once the helical thread insert 10 has been installed in the parent material 40 it is desirable that the helical thread insert 10 remain installed in the threaded bore 42. However, external forces may apply counterclockwise torques on the helical thread insert 10 that may rotate the helical thread insert 10 in a counterclockwise direction, possibly causing helical thread insert 10 to be inadvertently removed from the threaded bore 42. Conditions such as galling and vibrations also increase the effect of forces that act on the helical thread insert 10. As shown in FIG. 1, end 7 is positioned adjacent the female threads 44 of the parent material 40. Chamfers 8 and 9 provide a ramped face by which the female threads 44 can pass with little resistance possible leading to inadvertent removal.

Figure 5:
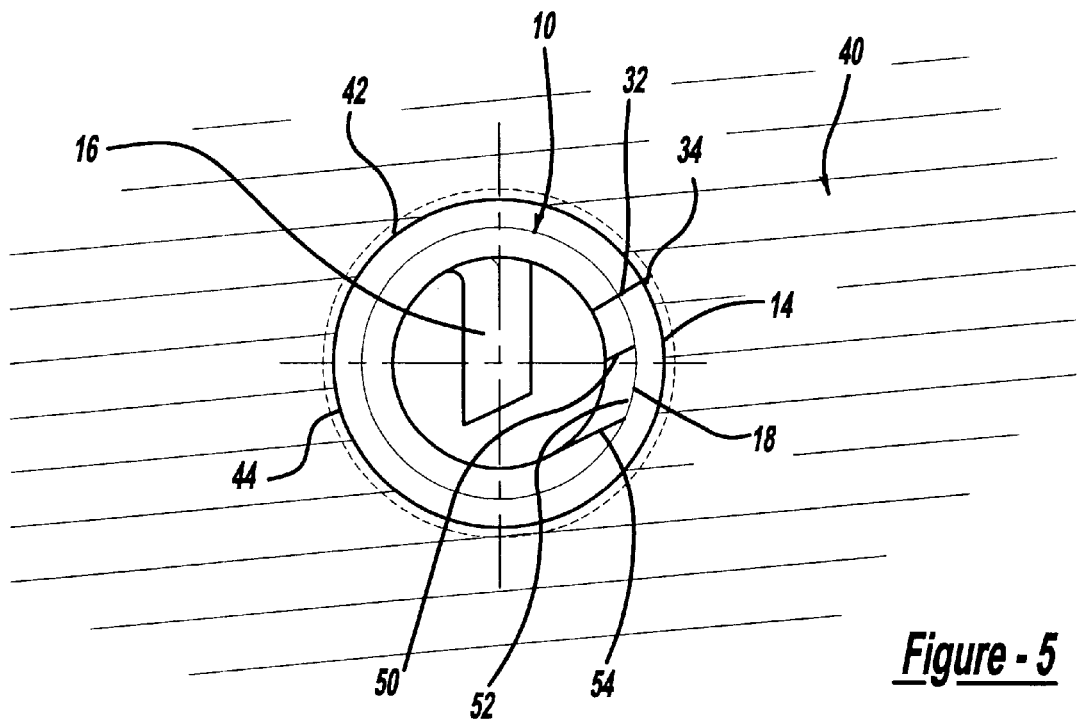
FIG. 5 is a back view of a thread insert of the present invention disposed in a workpiece.

FIG. 5 shows helical thread insert 10 disposed in a threaded bore 42 located within parent material 40. In the preferred embodiment, a retention device is provided and includes a face 32 proximate end portion 14 to prevent counterclockwise rotation of the thread insert 10. Male thread 22, and more specifically, edge 34 of face 32, is located adjacent to female threads 44 of the threaded bore 42. In the event that a counterclockwise torque is applied to the helical thread insert 10, edge 34 begins to move along the female threads 44, thereby digging into the parent material 40. The female threads 44 engage and dig into the parent material 40 due to the normal orientation of face 32 and the difference in hardness of the helical thread insert 10 relative the parent material 40. Edge 34 effectively prevents counterclockwise rotation of the helical thread insert 10 by transferring the forces that act on helical thread insert 10 to the parent material 40.

In situations where helical thread inserts 10 are worn, damaged or unwanted, it may be necessary to remove them from the threaded bore 42 without damaging the female threads 44. The helical thread insert 10 of the present invention provides a removal notch 18 to aid in removal of the helical thread insert 10. Removal notch 18 is formed in the last female thread of rear end portion 14. Removal notch 18 is comprised of a engagement face 50 that extends generally inward from female threads 20 at an acute angle, an outer face 52 that is substantially parallel to a longitudinal direction of helical thread insert 10, and a relief face 54 that forms the end portion of removal notch 18.

Figure 6:
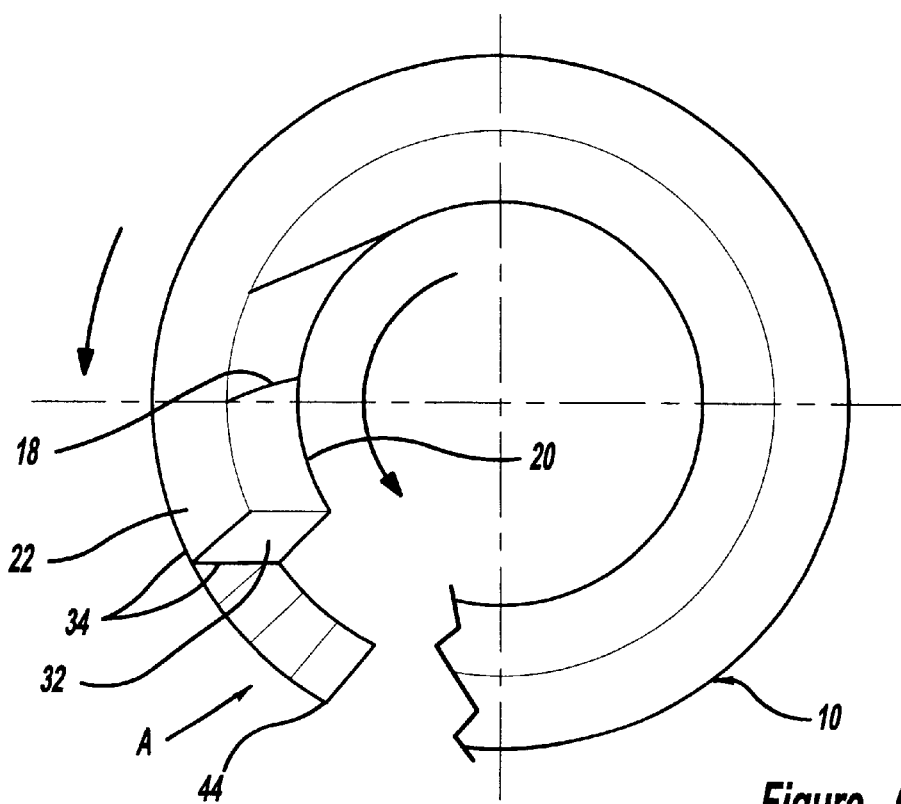
FIG. 6 is a view of a thread insert according to the preferred embodiment showing a removal notch at one end.

As shown in FIG. 6, removal notch 18 provides a means of engaging helical thread insert 10 and applying a counterclockwise torque for removal of the helical thread insert 10. Additionally, the removal notch 18 of the present invention allows a tool (not shown) to direct face 32, and more importantly edge 34, in the direction of arrow A, thus eliminating the contact of edge 34 with female threads 44, and thereby preventing digging of the coil 12 into the softer parent material 40.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A helical thread insert for insertion into a bore of a workpiece, said helical thread insert comprising:

a front end portion including a tang and a first notch for defining a separation point between said tang and said front end portion;

a rear end portion including an edge operable to selectively snag the workpiece to prevent relative rotation therebetween; and a central portion interconnecting said front end portion and said rear end portion, wherein said rear end portion includes a second notch disposed near said edge.

2. The helical thread insert of claim 1, wherein said second notch is adapted to receive a tool for rotating the helical thread insert, said edge disengaging from the workpiece to allow relative rotation therebetween in response to a force exerted by said tool.

3. The helical thread insert of claim 2, wherein said second notch includes an engagement face for operable engagement with said tool.

4. The helical thread insert of claim 3, wherein said engagement face is formed at an angle relative a longitudinal axis of the helical thread insert, said edge disengaging the workpiece when said tool applies a force to said engagement face.

5. A helical thread insert for insertion into a bore of a workpiece, said helical thread insert comprising:

a front end portion;

a rear end portion including an edge operable to selectively snag the workpiece to prevent relative rotation therebetween and a first notch disposed proximate said edge; and a central portion interconnecting said front end portion and said rear end portion, wherein said first notch is formed at an angle relative a longitudinal axis of said central portion.

6. The helical thread insert of claim 5, wherein said first notch includes an engagement face operable to receive a removal tool.

7. The helical thread insert of claim 6, wherein said edge is disengaged from the workpiece when the removal tool applies a force to said engagement face.

* * * * *